US009842547B2

(12) United States Patent
Yamakawa

(10) Patent No.: US 9,842,547 B2
(45) Date of Patent: Dec. 12, 2017

(54) DISPLAY APPARATUS AND TELEVISION RECEIVER

(71) Applicant: Sakai Display Products Corporation, Sakai-shi, Osaka (JP)

(72) Inventor: Ryo Yamakawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 19 days.

(21) Appl. No.: 14/772,293

(22) PCT Filed: Apr. 23, 2014

(86) PCT No.: PCT/JP2014/061485
§ 371 (c)(1),
(2) Date: Sep. 2, 2015

(87) PCT Pub. No.: WO2014/181691
PCT Pub. Date: Nov. 13, 2014

(65) Prior Publication Data
US 2016/0027383 A1 Jan. 28, 2016

(30) Foreign Application Priority Data

May 8, 2013 (JP) ................................. 2013-098708

(51) Int. Cl.
*G09G 3/34* (2006.01)
*G09G 3/36* (2006.01)
(Continued)

(52) U.S. Cl.
CPC ........... *G09G 3/342* (2013.01); *G09G 3/3611* (2013.01); *H04N 21/4318* (2013.01);
(Continued)

(58) Field of Classification Search
CPC ................. G09G 3/342; G09G 3/3611; G09G 2310/024; G09G 2320/0646;
(Continued)

(56) References Cited

U.S. PATENT DOCUMENTS

2002/0067332 A1* 6/2002 Hirakata ................ G09G 3/342
345/102
2005/0248524 A1* 11/2005 Feng .................... G09G 3/3413
345/102
(Continued)

FOREIGN PATENT DOCUMENTS

JP        2010-276928 A    12/2010

*Primary Examiner* — Christopher E Leiby
(74) *Attorney, Agent, or Firm* — Rudy J. Ng; Bret E. Field; Bozicevic, Field & Francis LLP

(57) ABSTRACT

A display apparatus includes a liquid crystal panel, and a plurality of light sources irradiating the liquid crystal panel with light. The display apparatus inserts black signals during a predetermined period within respective frame periods in a plurality of image frames. The display apparatus respectively displays signals corresponding to the respective regions in each image frame into which the black signals are inserted, in respective regions of the liquid crystal panel irradiated with light by each of the light sources, in an order along an arrangement direction of the respective regions. The display apparatus respectively irradiates the respective regions with light by the light sources corresponding thereto, in a latter period within a period in which the corresponding signals are respectively displayed in the respective regions of the liquid crystal panel. In this case, the display apparatus reduces luminance of light from the light sources corresponding to the respective regions, in an order of respectively displaying the signals in the respective regions of the liquid crystal panel, corresponding thereto.

5 Claims, 12 Drawing Sheets

(51) Int. Cl.
*H04N 21/431* (2011.01)
*H04N 21/44* (2011.01)
*H04N 5/57* (2006.01)

(52) U.S. Cl.
CPC . *H04N 21/44008* (2013.01); *G09G 2310/024* (2013.01); *G09G 2310/061* (2013.01); *G09G 2320/0646* (2013.01); *H04N 5/57* (2013.01)

(58) Field of Classification Search
CPC ......... G09G 2310/061; H04N 21/4318; H04N 21/44008; H04N 5/57
See application file for complete search history.

(56) References Cited

U.S. PATENT DOCUMENTS

| | | | | |
|---|---|---|---|---|
| 2009/0122087 | A1* | 5/2009 | Maruyama | G09G 3/3611 345/690 |
| 2009/0243995 | A1* | 10/2009 | Kimura | G09G 3/342 345/102 |
| 2010/0085375 | A1* | 4/2010 | Chung | G09G 3/3406 345/589 |
| 2011/0164003 | A1* | 7/2011 | Kobayashi | G09G 3/3644 345/204 |
| 2012/0092360 | A1* | 4/2012 | Kang | G09G 3/3413 345/589 |
| 2014/0085346 | A1* | 3/2014 | Tsukagoshi | G09G 5/10 345/690 |
| 2014/0204314 | A1* | 7/2014 | Tseng | G02F 1/1336 349/65 |
| 2015/0130854 | A1* | 5/2015 | Matsumoto | H04N 13/0438 345/690 |

* cited by examiner

FIRST REGION

SIXTH REGION

F I G. 6
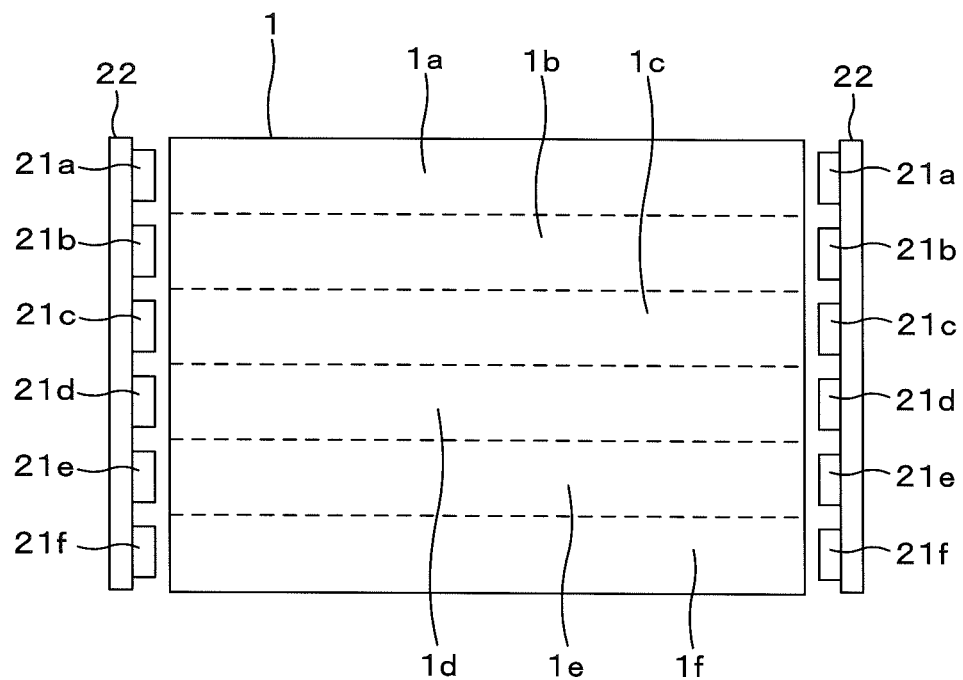

FIRST REGION 1a

SECOND REGION 1b

THIRD REGION 1c

FOURTH REGION 1d

FIFTH REGION 1e

SIXTH REGION 1f

FIRST REGION 1a

SIXTH REGION 1f

FIRST REGION 1a

SECOND REGION 1b

THIRD REGION 1c

FOURTH REGION 1d

FIFTH REGION 1e

SIXTH REGION 1f

FIRST REGION 1a

SIXTH REGION 1f

DISPLAY APPARATUS AND TELEVISION RECEIVER

CROSS-REFERENCE TO RELATED APPLICATION

This application is the national phase under 35 U.S.C. §371 of PCT International Application No. PCT/JP2014/061485 which has an International filing date of Apr. 23, 2014 and designated the United States of America.

BACKGROUND

1. Technical Field

The present invention relates to a display apparatus including a liquid crystal panel which displays an image and a plurality of light sources which irradiate the liquid crystal panel with light, and a television receiver.

2. Description of Related Art

When a liquid crystal display (LCD) displays, for example, an image having movement, an afterimage phenomenon, in which an outline of a moving portion is obscurely perceived in a human vision, may easily occur. The reason is that the liquid crystal display is a hold type display apparatus which holds display light for one frame period after writing of data in a pixel is ended and before the next writing of data in the pixel is started.

Herein, as a technique for improving moving image display performance of the liquid crystal display, a black insertion method has been known in the art. The black insertion method is a technique in which an image signal and a black signal are written in the liquid crystal display within each frame period of an image frame, thereby the black signal is inserted between the image signals which follow in time sequence, so as to perform a pseudo impulse type display control. In addition, a backlight scanning technique, in which a backlight (light source) is divided into a plurality of regions and the backlight is turned on for each region, has been known in the art. The backlight scanning technique is a technique in which a turning off period of the backlight is set within a period of displaying one image frame by the liquid crystal display, thereby a display period of one image (image frame) is shortened, so as to perform the pseudo impulse type display control. By these techniques, it is possible to reduce the afterimage phenomenon occurring at the time of displaying the moving images in the liquid crystal display.

Hereinafter, processing of controlling the liquid crystal panel and the backlight simultaneously using the black insertion method and the backlight scanning technique will be described.

FIG. 1 is a schematic view illustrating a relationship between the liquid crystal panel and the light source in the liquid crystal display. FIG. 1 illustrates a liquid crystal panel 90 as seen from a display surface side. The liquid crystal display illustrated in FIG. 1 is a light guide type (edge light type) liquid crystal display, and includes the liquid crystal panel 90, and light sources 91 to 96 which irradiate the liquid crystal panel 90 with light. In addition, the liquid crystal display includes a light guide plate (not illustrated) which is disposed on a back surface side (surface side opposite to the display surface) of the liquid crystal panel 90 to guide light from the light sources 91 to 96 to the liquid crystal panel 90. The liquid crystal panel 90 is configured to perform the display control of the image for each display region (first region, second region, . . . , and sixth region) which is divided into six, for example, in a longitudinal direction (vertical direction) and respectively has a strip shape. The light guide plate has a size substantially the same as the liquid crystal panel 90. The light sources 91 to 96 are provided at positions respectively facing both end surfaces of the light guide plate in a lengthwise direction (lateral direction) thereof, that is, positions respectively corresponding to two short sides of each display region of the liquid crystal panel 90. Thereby, the respective light sources 91 to 96 irradiate each display region of the liquid crystal panel 90 with light through the light guide plate.

FIG. 2 is a view for describing control processing for the liquid crystal panel 90 and the light sources 91 to 96. FIG. 2 illustrates a change in the display image and a change in values of current applied to the light sources 91 to 96 with the passage of time, in each display region (first region, second region, . . . , sixth region) of the liquid crystal panel 90. Further, FIG. 2 illustrates a time axis (lateral axis) for showing the change in the display image, and a lateral axis (time axis) and a vertical axis (current value) for showing the change in the values of current applied to the light source 91, only for the first region, and the axes are not illustrated for the other display regions.

In an example illustrated in FIG. 2, displaying of the image signals in each display region is sequentially started with predetermined time-lags in an order of the first region, the second region, . . . , and the sixth region, and one frame (image frame) is displayed on the liquid crystal panel 90 as a whole. In addition, the black signals (black images) are inserted into each frame to be displayed on the liquid crystal panel 90, and in the image signals displayed in each display region, the black signals are respectively inserted between the image signals which follow in time sequence. The respective light sources 91 to 96 are controlled so as to irradiate each display region with light during a latter period within a period in which each display region displays each image signal. Specifically, the light sources 91 to 96 are turned on when a predetermined time t has elapsed after the displaying of the image signal in the corresponding display regions is started, and are turned off when the displaying of the next black signal in each display region is started. Further, the values of current applied to the respective light sources 91 to 96 are the same as each other and the respective light sources 91 to 96 irradiate the display regions with light having the same luminance as each other.

In this way, moving images can be sharply displayed and the moving image display performance of the liquid crystal display can be improved, by simultaneously using the black insertion method and the backlight scanning technique.

However, when performing the control processing as illustrated in FIG. 2, the light from the light sources 91 to 96 which have been turned on enters (is leaked) into the display region corresponding to the light sources 91 to 96 which have been turned off, thereby the luminance distribution is not uniform in the liquid crystal panel 90. For example, in a period in which a first image signal is displayed in the first region, the light source 92 as well as the light source 91 corresponding to the first region is turned on, and the light from the light source 92 also enters into the first region. In addition, in a period in which the first image signal is displayed in the second region, the light sources 91 and 93 as well as the light source 92 corresponding to the second region are turned on, and the light from the light sources 91 and 93 also enter into the second region. Similarly, in a period in which the first image signal is displayed in the sixth region, all the light sources 91 to 96 are turned on, and the light from all the light sources 91 to 96 enter into the sixth region. In a period in which the black signals are displayed in each display region, even when the light from the light sources 91 to 96 other than the light sources 91 to 96 corresponding to each display region enter into each display region, an effect by the entering light is small. In this way, when the image signals are displayed in each display region, an amount of light entering into each display region is different, and therefore a deviation in luminance distribution occurs in the liquid crystal panel 90. As illustrated in FIG. 2, when displaying the image on the liquid crystal panel 90 by scanning each display region in the order of the first region, the second region, . . . , and the sixth region, the luminance at a lower portion (sixth region) of the screen is higher than the luminance at an upper portion (first region) of the screen.

FIGS. 3A and 3B are views for describing the deviation in the luminance distribution in the liquid crystal panel 90. FIGS. 3A and 3B illustrate a change in luminance of the image signals and a change in luminance in the display screen with the passage of time, in the first region and the sixth region. As illustrated in FIGS. 3A and 3B, in the first region and the sixth region, the luminance based on the first image signal is substantially the same as each other. Meanwhile, a difference in the luminance on the display screen of the first image signal, that is, in the luminance after the light from the light sources 91 to 96 passes through the first region and the sixth region, which are displaying the first image signal, occurs between the first region and the sixth region. The reason is that the first region is in the display state of the black signal during a part or all of the periods in which the light sources 92 to 96 are turned on, and therefore the effect by the leakage of the light from the light sources 92 to 96 to the first region is small, while the sixth region is in the display state of the image signal for all the periods in which the light sources 91 to 95 are turned on, and therefore the effect by the leakage of the light from the light sources 91 to 95 to the sixth region is large. When the image signals are displayed in each display region in an order from the upper portion of the screen to the lower portion thereof, the above effect is increased toward the lower portion of the screen. Thereby, when the image signals having substantially the same luminance as each other are displayed in each display region, the luminance is increased (is higher) toward the lower portion of the screen.

In order to suppress the above-described deviation in the luminance distribution in the liquid crystal panel 90, it is conceivable that an appropriate pattern is formed on the light guide plate, so that each light from the light sources 91 to 96 does not leak to a region other than the display regions corresponding thereto.

In addition, Japanese Patent Application Laid-Open No. 2010-276928 proposes a configuration in which a light source corresponding to a lower region of a liquid crystal panel is turned off while the light source corresponding to an upper region thereof is turned on, so that the turn on time (lighting time) of the light sources corresponding to the respective regions of the liquid crystal panel does not overlap with each other. Thus, in the configuration in which a deviation in the luminance distribution in the liquid crystal panel occurs, the light source corresponding to the lower region of the liquid crystal panel is turned on while the light source corresponding to the upper region is turned off, and a ratio of the lighting time of the light source corresponding to the lower region is more increased than the ratio of the lighting time of the light source corresponding to the upper region and a center region, and thereby suppressing the deviation in the luminance distribution in the liquid crystal panel. By this, in the apparatus disclosed in Japanese Patent Application Laid-Open No. 2010-276928, even when the light source corresponding to the lower region is turned off so that the lighting time of the light sources corresponding to the respective regions of the liquid crystal panel does not overlap, a decrease in the luminance in the lower region can be suppressed, and thereby suppressing the deviation in the luminance distribution in the liquid crystal panel.

SUMMARY

However, it is very difficult to completely prevent the light from the light sources 91 to 96 from being leaked to the regions other than the display regions respectively corresponding thereto by forming the pattern on the light guide plate. In addition, the technique disclosed in Japanese Patent Application Laid-Open No. 2010-276928 does not suppress the deviation in the luminance distribution in the liquid crystal panel which occurs due to the leakage of the light from the respective light sources to a region other than the regions respectively corresponding thereto.

The present invention has been made with the aim of solving the above problems. It is an object of the present invention to provide a display apparatus capable of suppressing a deviation in luminance distribution in a liquid crystal panel occurring due to a leakage of light from the respective light sources to a region other than regions respectively corresponding thereto and a television receiver.

A display apparatus according to the present invention comprises: a liquid crystal panel which displays an image; and a plurality of light sources which are juxtaposed in a predetermined direction and irradiate the liquid crystal panel with light. The display apparatus comprises: a black insertion unit which inserts black signals during at least a part of respective frame periods in a plurality of image frames; a display control unit which respectively displays signals corresponding to the respective regions, among each image frame into which the black signals are inserted by the black insertion unit, in respective regions of the liquid crystal panel irradiated with light from the respective light sources, in an order along an arrangement direction of the respective regions corresponding to a juxtaposition direction of the light sources; and a light source control unit which irradiates the respective regions with light from the light sources corresponding to the respective regions, during a latter period within a period in which the display control unit respectively displays the signals in the respective regions of the liquid crystal panel. In the display apparatus, the light source control unit controls the respective light sources, so as to reduce luminance of light from the light sources corresponding to the respective regions, in an order in which the display control unit respectively displays the signals in the respective regions of the liquid crystal panel. Further, in the display apparatus according to the present invention, the light source control unit irradiates the respective regions with light, during a latter period within a period in which the display control unit displays signals other than the black signals inserted by the black insertion unit, among the signals corresponding to the respective regions in each image frame, in the respective regions of the liquid crystal panel.

In the display apparatus according to the present invention, the light source control unit reduces values of current applied to the light sources corresponding to the respective regions, in an order in which the display control unit respectively displays the signals in the respective regions of the liquid crystal panel.

In the display apparatus according to the present invention, the light source control unit controls the luminance of light from the respective light sources so that the luminance in a display screen of the respective regions is substantially the same as each other when the display control unit respectively displays the respectively corresponding signals in the respective regions of the liquid crystal panel.

In the display apparatus according to the present invention, the light source control unit irradiates the respective regions with light by the light sources corresponding to the respective regions, during a period from a time point when a predetermined time has elapsed since the display control unit started displaying the signals in the respective regions of the liquid crystal panel to a time point when the display control unit starts displaying the black signals in the respective regions.

A television receiver according to the present invention comprises the above-described display apparatus, and a receiving unit which receives television broadcasts. The television receiver displays an image based on the television broadcasts received by the receiving unit on the display apparatus.

According to the present invention, even when the light from the respective light sources is leaked to the regions other than the regions respectively corresponding thereto, it is possible to suppress the deviation in the luminance distribution in the liquid crystal panel.

The above and further objects and features will more fully be apparent from the following detailed description with accompanying drawings.

BRIEF DESCRIPTION OF THE SEVERAL VIEWS OF THE DRAWINGS

FIG. 6 is a schematic view illustrating a relationship between the liquid crystal panel and the light source;

DETAILED DESCRIPTION

The following will describe in detail a display apparatus and a television receiver according to the present invention with reference to the drawings illustrating some embodiments applied to a television receiver.

(Embodiment 1)

Figure 4:
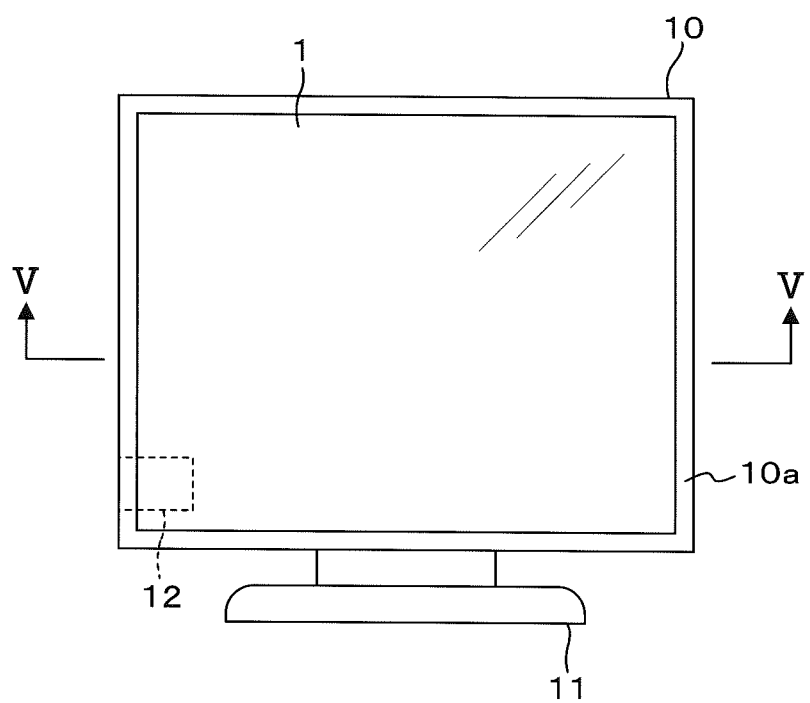
FIG. 4 is a front view illustrating an appearance of a television receiver according to Embodiment 1.

FIG. 4 is a front view illustrating an appearance of a television receiver according to Embodiment 1. A display screen side of the television receiver will be referred to as a front. The television receiver of Embodiment 1 has a rectangular main unit 10 provided with a liquid crystal panel 1, and a stand 11 for supporting the main unit 10. The stand 11 supports the main unit 10 in a state where the liquid crystal panel 1 is standing. The main unit 10 is provided with a tuner (receiving unit) 12 for receiving a broadcast signal of television broadcast at an appropriate position inside thereof, and the television receiver displays an image on the liquid crystal panel 1 based on the broadcast signal received by the tuner 12. The display apparatus according to the present invention is not limited to the television receiver in which the main unit 10 is supported by the stand 11, and it may be applied to a television receiver in which the main unit 10 is attached to an indoor wall, etc. Hereinafter, a left-and-right direction and an up-and-down direction of the television receiver illustrated in FIG. 4 will be referred to as a lateral direction and a vertical direction, respectively.

Figure 5:
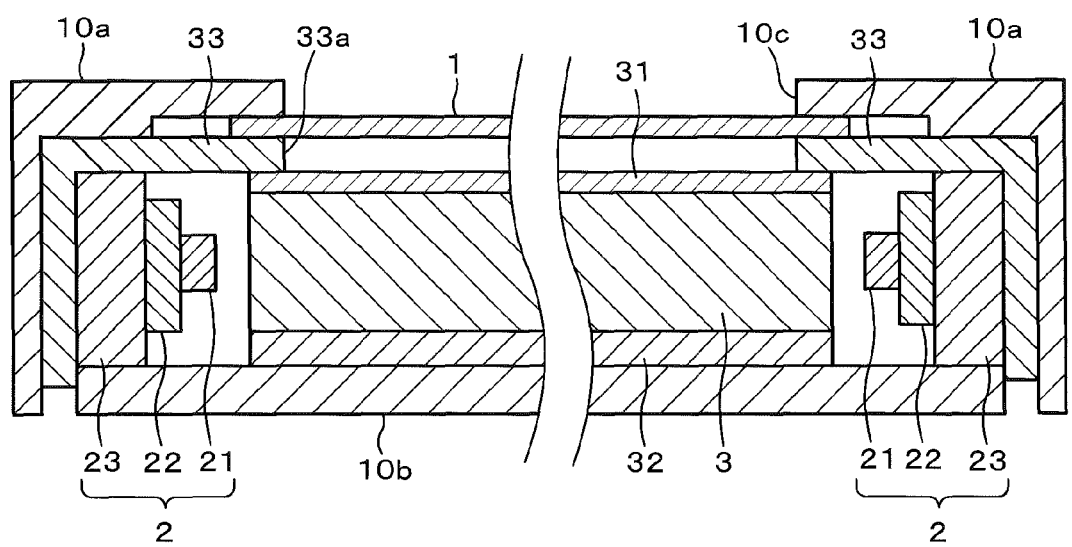
FIG. 5 is a cross-sectional view taken on line V-V in FIG. 4.

FIG. 5 is a cross-sectional view taken on line V-V in FIG. 4. The television receiver of Embodiment 1 is provided with the rectangular liquid crystal panel 1, so as to form a part of one side surface of the main unit 10. The liquid crystal panel 1 is formed, for example, by arranging a plurality of liquid crystal elements in a two-dimensional matrix shape. The main unit 10 has a housing including a frame-shaped front cover 10a which surrounds a peripheral edge of the liquid crystal panel 1 from the front side (display screen side) and a rectangular back cover 10b which closes a back surface side (rear surface side of the display screen) of the liquid crystal panel 1. In the main unit 10 (inside of the housing), a light guide plate 3 having a size substantially the same as the liquid crystal panel 1 is housed, and the light guide plate 3 is disposed with one surface thereof facing the back surface (rear surface of the display screen) of the liquid crystal panel 1. In addition, in the main unit 10, two light source units 2 are housed in a state of facing each of left and right end surfaces of the light guide plate 3.

Each of the light source units 2 includes a strip-shaped substrate 22 disposed to face one of the left and right end surfaces of the light guide plate 3, a plurality of light sources 21 mounted on the substrate 22 in a lengthwise direction thereof, and a square column-shaped holding plate 23 which holds the substrate 22 and the light sources 21. The light source 21 is, for example, a light emitting diode (LED), a cold cathode fluorescent lamp (CCFL), an external electrode fluorescent lamp (EEFL), a hot cathode fluorescent lamp (HCFL) or the like. According to Embodiment 1, as will described with reference to FIG. 6 below, six light sources 21 (21a to 21f) are mounted on the respective substrates 22 at an equal interval, and the respective light sources 21 are disposed so as to irradiate the end surface of the light guide plate 3 with the light.

The light guide plate 3 is made of a high transparency acrylic resin, for example, and converts light made incident on the left and right end surfaces from the light source unit 2 (light source 21) into flat light to irradiate the liquid crystal panel 1 with the flat light. One surface of the light guide plate 3 facing the liquid crystal panel 1 is provided with an optical sheet 31, and the other surface thereof is provided with a reflection sheet 32. The reflection sheet 32 is formed of a white resin having excellent light reflecting properties, for example, and reflects the light made incident on the light guide plate 3 from the light source unit 2. A surface of the reflection sheet 32 facing the light guide plate 3 may be applied with a paint having excellent light reflecting properties.

The light reflected by the reflection sheet 32 passes through the light guide plate 3 to be made incident on the optical sheet 31. The optical sheet 31 has, for example, a diffusion sheet, a light collecting sheet, and the like. The diffusion sheet uniformly diffuses the light reflected by the reflection sheet 32 and passing through the light guide plate 3, and the light collecting sheet collects the light, and then the optical sheet 31 irradiates the liquid crystal panel 1 with a uniform flat light.

By the above-described configuration, a backlight which illuminates the liquid crystal panel 1 from the back surface side can be realized by the light source units 2, the light guide plate 3, the optical sheet 31, and the reflection sheet 32.

A surface of the light guide plate 3 facing the optical sheet 31 may be formed with a pattern which is configured to appropriately guide the light made incident thereon from the light source unit 2 and reflected by the reflection sheet 32 toward the liquid crystal panel 1. In this case, the light guide plate 3 can uniformly transmit the light reflected by the reflection sheet 32 to the optical sheet 31.

The backlight (light source units 2, light guide plate 3, optical sheet 31, and reflection sheet 32) having the above-described configuration is held (pinched) by a backlight holding part 33 and the back cover 10b. The backlight holding part 33 is formed in a frame shape which surrounds the peripheral edge of the light guide plate 3 on which the optical sheet 31 and the reflection sheet 32 are provided (hereinafter briefly referred to as the light guide plate 3) from the liquid crystal panel 1 side. Specifically, the backlight holding part 33 is formed in a shape which surrounds the peripheral edge of the optical sheet 31. More Specifically, the backlight holding part 33 is formed in a frame shape having an L-shaped cross section by providing an opening part 33a having a slightly smaller rectangular cross section than the optical sheet 31 on a bottom of a shallow dish-shaped plate member. The back cover 10b is formed in a larger rectangular shape than the optical sheet 31 (reflection sheet 32 and light guide plate 3).

The peripheral edge of the surface of the optical sheet 31 facing the liquid crystal panel 1 abuts an inner surface of the backlight holding part 33 along the opening part 33a, and the back surface (rear surface of the surface facing the light guide plate 3) of the reflection sheet 32 abuts a center of the back cover 10b. The backlight holding part 33 and the back cover 10b are fixed to each other while the backlight holding part 33 presses the light guide plate 3 to the back cover 10b, such that the light guide plate 3 is pinched (fixed) by the backlight holding part 33 and the back cover 10b. In addition, in a space sandwiched by the backlight holding part 33 and the back cover 10b, the two light source units 2 are disposed so that the light sources 21 face the two opposite end surfaces (left and right end surfaces) of the light guide plate 3. Similarly, the light source units 2 are also pinched (fixed) by the backlight holding part 33 and the back cover 10b.

The front cover 10a is slightly larger than the backlight holding part 33, and is formed in the same frame shape as the backlight holding part 33. An outer surface of the backlight holding part 33 along the opening part 33a abuts the peripheral edge of the back surface (rear surface of the display screen) of the liquid crystal panel 1, and the peripheral edge of the display screen of the liquid crystal panel 1 abuts the inner surface of the front cover 10a along an opening part 10c thereof. The inner surface of the front cover 10a abuts the peripheral edge of the display screen of the liquid crystal panel 1, and abuts the outer surface of the backlight holding part 33. Thereby, in a plane part of the front cover 10a having the opening part 10c, the opening part 10c side is thinly formed by as much as the thickness of the liquid crystal panel 1. The front cover 10a and the backlight holding part 33 (back cover 10b) are fixed to each other while the front cover 10a presses the liquid crystal panel 1 to the backlight holding part 33, such that the liquid crystal panel 1 is pinched (fixed) by the front cover 10a and the backlight holding part 33 (back cover 10b).

FIG. 6 is a schematic view illustrating a relationship between the liquid crystal panel 1 and the light source 21. FIG. 6 illustrates the liquid crystal panel 1, the light sources 21 (21a to 21f), and the substrates 22 when seeing the television receiver of Embodiment 1 from the display screen side. As illustrated by a dashed line in FIG. 6, in the television receiver of Embodiment 1, the display region of the liquid crystal panel 1 is divided into six regions in the vertical direction, and the display control of the image with respect to the respective strip-shaped regions 1a, 1b, 1c, 1d, 1e, and 1f is individually executed. The respective regions are referred to as a first region 1a, a second region 1b, . . . , and a sixth region 1f in the order from the top. The respective light source units 2 have six light sources 21, and the respective light sources 21a, 21b, 21c, 21d, 21e, and 21f are disposed at positions corresponding to the respective regions 1a, 1b, 1c, 1d, 1e, and 1f of the liquid crystal panel 1. Specifically, the respective light sources 21a, 21b, 21c, 21d, 21e, and 21f are disposed to face each of the left and right end surfaces of the respective regions of the light guide plate 3 facing the respective regions 1a, 1b, 1c, 1d, 1e, and 1f of the liquid crystal panel 1.

In the above-described configuration, the light from the two light sources 21a is emitted to the first region 1a of the liquid crystal panel 1 through the light guide plate 3. Similarly, the light from the two light sources 21b is emitted to the second region 1b, the light from the two light sources 21c is emitted to the third region 1c, and the light from the two light sources 21d is emitted to the fourth region 1d. In addition, the light from the two light sources 21e is emitted to the fifth region 1e, and the light from the two light sources 21f is emitted to the sixth region 1f.

In the television receiver of Embodiment 1, the same driving control is performed on the respective two light sources of the light sources 21a to 21f, but each different driving control is performed on each of the light sources 21a to 21f.

Figure 7:
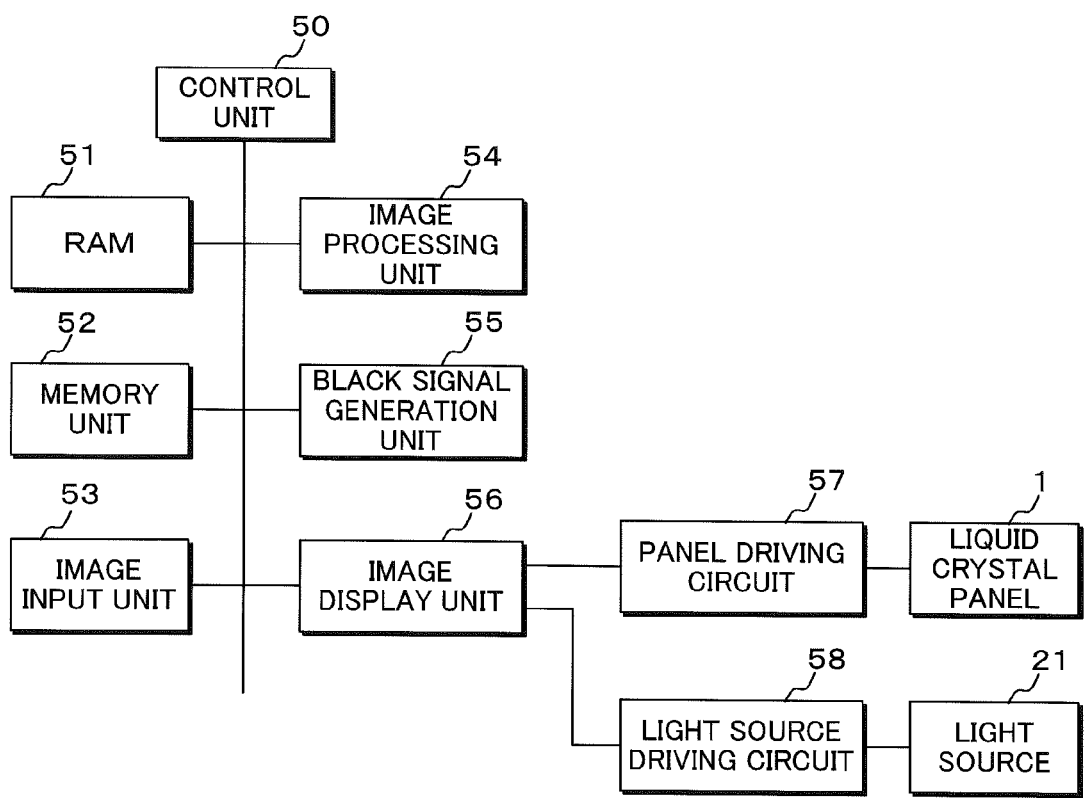
FIG. 7 is a block view illustrating an internal configuration example of the television receiver of Embodiment 1.

FIG. 7 is a block view illustrating an internal configuration example of the television receiver of Embodiment 1. The television receiver of Embodiment 1 includes a control unit 50, a random access memory (RAM) 51, a memory unit 52, an image input unit 53, an image processing unit 54, a black signal generation unit 55, an image display unit 56 and the like. The television receiver of Embodiment 1 may include an operation unit for allowing a user to operate the television receiver, a receiver receiving a signal output from a remote controller for allowing a user to remotely operate the television receiver, and the like, in addition the above-described configuration.

The control unit 50 is a central processing unit (CPU), a microprocessor unit (MPU) and the like. The control unit 50 appropriately loads and executes a control program stored in the memory unit 52 into an RAM 51 to control each above-described hardware unit, thereby the television receiver operates as the display apparatus according to the present invention.

The RAM 51 is a static RAM (SRAM), a dynamic RAM (DRAM), a flash memory and the like. The RAM 51 temporarily stores various data which are generated when the control unit 50 executes the control program. The memory unit 52 is nonvolatile memories such as an electrically erasable and programmable ROM (EEPROM), a flash memory, a hard disk drive (HDD) and the like. The memory unit 52 previously stores control programs and various data to be executed by the control unit 50.

The image input unit 53 can be connected with, for example, the tuner 12, a recording and playback apparatus, a digital camera, a personal computer (PC), and the like, and acquires an image signal sent from any one of the apparatuses. The image input unit 53 sends the acquired image signal to the image processing unit 54.

The image processing unit 54 executes various kinds of signal processing on the image signal acquired from the image input unit 53 to display an image on the liquid crystal panel 1, and sends the processed image signal to the image display unit 56. The image signal sent from the image processing unit 54 includes, for example, 30 image frames (hereinafter, referred to as a frame) per one second.

The black signal generation unit 55 generates black signals to be inserted in each frame period, with respect to each frame included in the image signals processed by the image processing unit 54. The black signal generation unit 55 executes generation processing of the black signal in accordance with an instruction from the control unit 50, and sends the generated black signal to the image display unit 56.

The control unit 50 determines whether the black signal is to be generated in accordance with the instruction from the user, and if it is determined that the black signal is to be generated, the control unit 50 instructs the black signal generation unit 55 to execute the generation processing of the black signal. For example, when the user performs the display instruction in a high image quality mode, the control unit 50 determines that the black signal is to be generated. In addition, the control unit 50 determines whether the image based on the image signal processed by the image processing unit 54 is a fast moving image, and if it is determined that the image is the fast moving image, the control unit 50 determines that the black signal is to be generated.

The image display unit 56 is connected with a panel driving circuit 57 for driving the liquid crystal panel 1 and a light source driving circuit 58 for controlling the turn on and off of the light source 21 (the respective light sources 21a to 21f) and the luminance of the light source 21. The image display unit 56 drives the panel driving circuit 57 and the light source driving circuit 58 based on the image signal acquired from the image processing unit 54 in accordance with the instruction from the control unit 50 to display the image based on the image signal on the liquid crystal panel 1. In addition, according to Embodiment 1, the image display unit (black insertion unit) 56 executes the processing of inserting the black signal generated by the black signal generation unit 55 into each frame of the image signal acquired from the image processing unit 54, in accordance with the instruction from the control unit 50. Specifically, the image display unit 56 changes the image signal in a latter half portion within each frame period of the image signal acquired from the image processing unit 54 into the black signal. Thereby, in this case, the image display unit 56 displays the image in which the black signal is inserted between the image signals which follow in time sequence on the liquid crystal panel 1. A period in which the black signal is inserted is not limited to the latter half period within each frame period, and may be a predetermined period within each frame period.

Herein, as illustrated in FIG. 6, the panel driving circuit 57 of Embodiment 1 respectively executes the display control of the image for the respective regions 1a to 1f of the liquid crystal panel 1. Further, the light source driving circuit 58 of Embodiment 1 respectively executes the driving control for the respective light sources 21a to 21f corresponding to the respective regions 1a to 1f of the liquid crystal panel 1.

Figure 8:
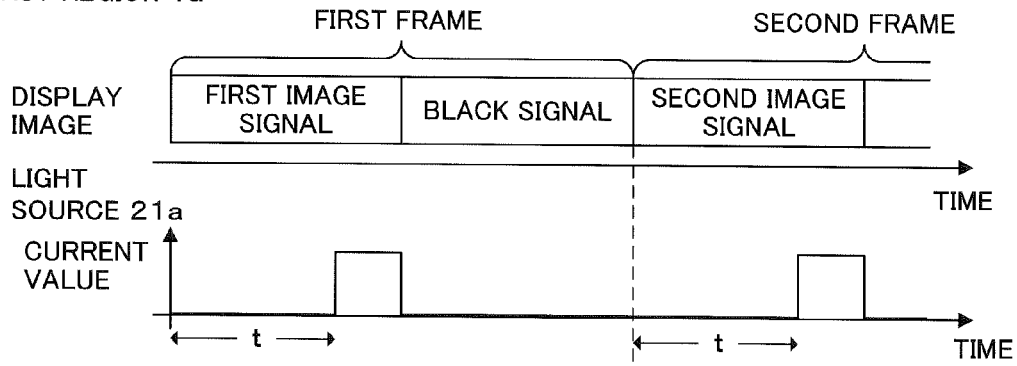
FIG. 8 is a view for describing the control processing for the liquid crystal panel and the light source.
Figure 8:
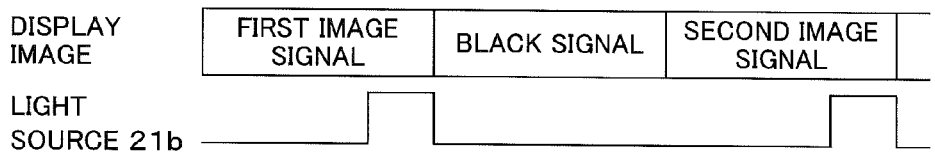
Figure 8:
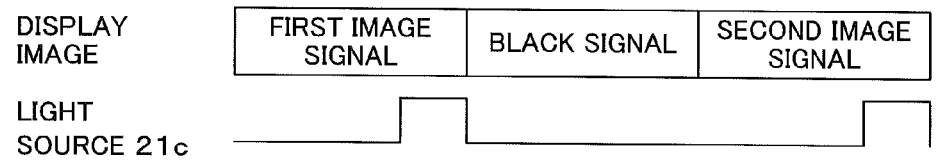
Figure 8:
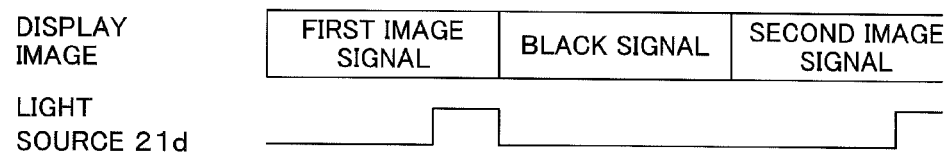
Figure 8:
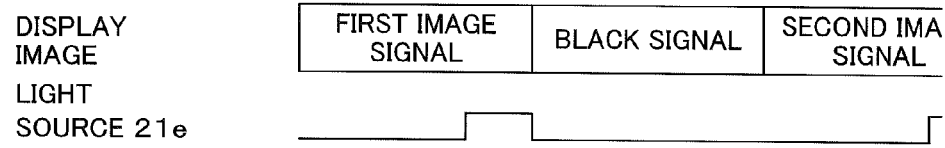
Figure 8:
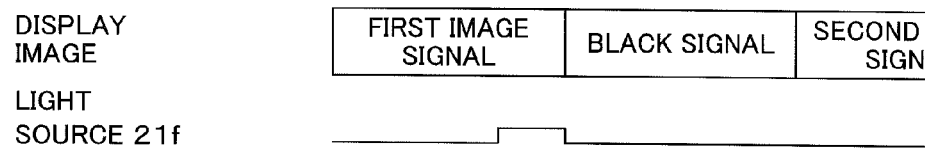

FIG. 8 is a view for describing the control processing for the liquid crystal panel 1 and the light source 21. FIG. 8 illustrates a change in the display image and a change in values of current applied to the respective light sources 21a to 21f with the passage of time, in the respective regions 1a to 1f of the liquid crystal panel 1. FIG. 8 illustrates a time axis (lateral axis) for showing the change in the display image, and a lateral axis (time axis) and a vertical axis (current value) for showing the change in the values of current applied to the light source 21a, only for the first region 1a. Though the axes for the other regions 1b to 1f are not illustrated, they are the same as the axes for the first region 1a.

As illustrated in FIG. 8, the panel driving circuit (display control unit) 57 of Embodiment 1 displays the image signal in the respective regions 1a, 1b, . . . , and 1f with predetermined time lags in an order of the first region 1a, the second region 1b, . . . , and the sixth region 1f, and displays one frame using the six regions. Specifically, the panel driving circuit 57 displays the signals to be displayed in the respective regions 1a to 1f among the image signals and the black signals included in each frame, in each of the regions 1a to 1f with predetermined time lags.

The light source driving circuit (light source control unit) 58 turns on the respective light sources 21a to 21f corresponding to the respective regions 1a to 1f, during a period from a time point when a predetermined time t has elapsed since the panel driving circuit 57 started displaying the image signals in the respective regions 1a to 1f to a time point when the panel driving circuit 56 starts displaying the next black signal in the respective regions 1a to 1f. Specifically, the respective light sources 21a to 21f are turned on when the predetermined time t has elapsed after the displaying of the image signals in the respectively corresponding regions 1a to 1f is started, and are turned off when the displaying of the black signals in the respectively corresponding regions 1a to 1f is started. Herein, the predetermined time t is time considering the time (transient response time) until each liquid crystal display element reaches transmittance based on the signal to be displayed.

In this way, while the black signal is inserted between the image signals which follow in time sequence, the respective light sources 21a to 21f are turned on only in the predetermined period among the period of displaying the image signal in the respective regions 1a to 1f, and thereby it is possible to achieve the pseudo impulse type display control. Therefore, even when displaying the fast moving image, the moving image can be sharply displayed, and the moving image display performance can be improved.

In addition, the light source driving circuit 58 of Embodiment 1 controls the light source 21 so as to reduce the values of current applied to the light sources 21a to 21f corresponding to the respective regions 1a to 1f, in an order in which the panel driving circuit 57 displays the image signals (each image signal included in the same frame) in the respective regions 1a to 1f. Specifically, the light source driving circuit 58 reduces the values of current applied to the respective light sources 21a to 21f in an order of the light sources 21a to 21f, and controls each light source 21 so as to sequentially reduce the luminance of light from the respective light sources 21a to 21f. Although the values of current applied to the respective light sources 21a to 21c are sequentially reduced, the values of current applied to the respective light sources 21a to 21c are larger than the values of current uniformly applied to the light sources 91 to 93 in the conventional processing. In addition, although the values of current applied to the respective light sources 21d to 21f are sequentially reduced, the values of current applied to the respective light sources 21d to 21f are smaller than the values of current uniformly applied to the light sources 94 to 96 in the conventional processing.

The values of current applied to the respective light sources 21a to 21f may be decided based on the results obtained by appropriately changing the values of current applied to the respective light sources 21a to 21f while displaying a predetermined image signal on the liquid crystal panel 1, for example, in a manufacturing step of the television receiver. Specifically, values obtained in a case that a deviation in luminance distribution in the liquid crystal panel 1 is further decreased may be decided as the values of current applied to the respective light sources 21a to 21f. In addition, the deviation of luminance distribution in the liquid crystal panel 1 is informed to the user by appropriately changing the values of current applied to the respective light sources 21a to 21f while displaying the predetermined image signal on the liquid crystal panel 1 in accordance with the instruction from the user of the television receiver, and respective values that a deviation in the luminance distribution desired by the user is obtained may be decided as the values of current applied to the respective light sources 21a to 21f.

Thereby, it is possible to suppress the deviation in the luminance distribution in the liquid crystal panel 1 which conventionally had occurred in the case that the light from the respective light sources 21a to 21f enters (is leaked) into the regions 1a to 1f other than the regions 1a to 1f corresponding thereto.

Figure 1:
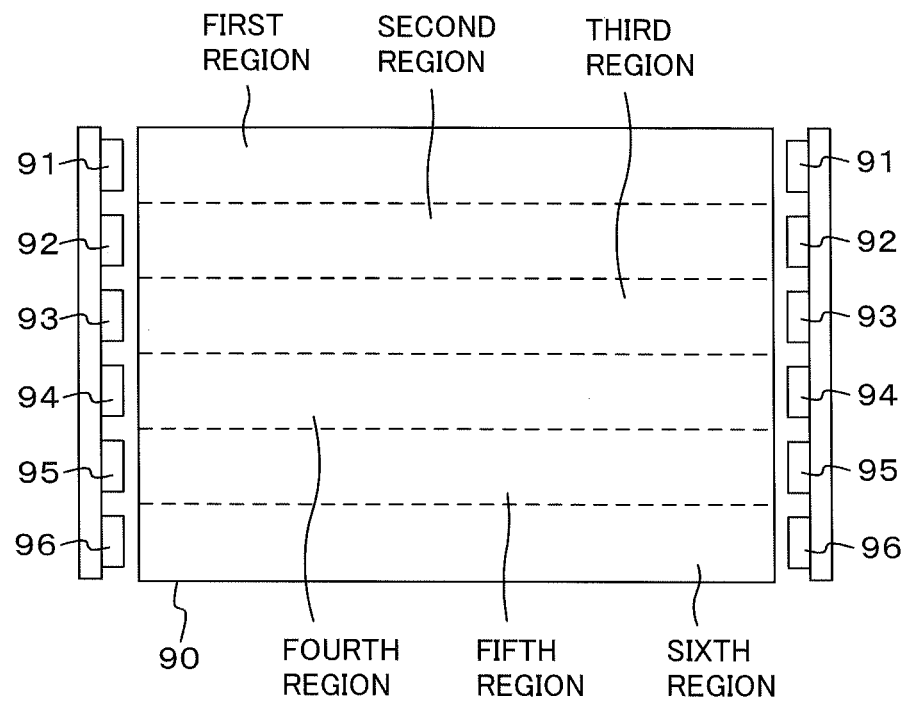
FIG. 1 is a schematic view illustrating a relationship between a liquid crystal panel and a light source in a liquid crystal display.
Figure 2:
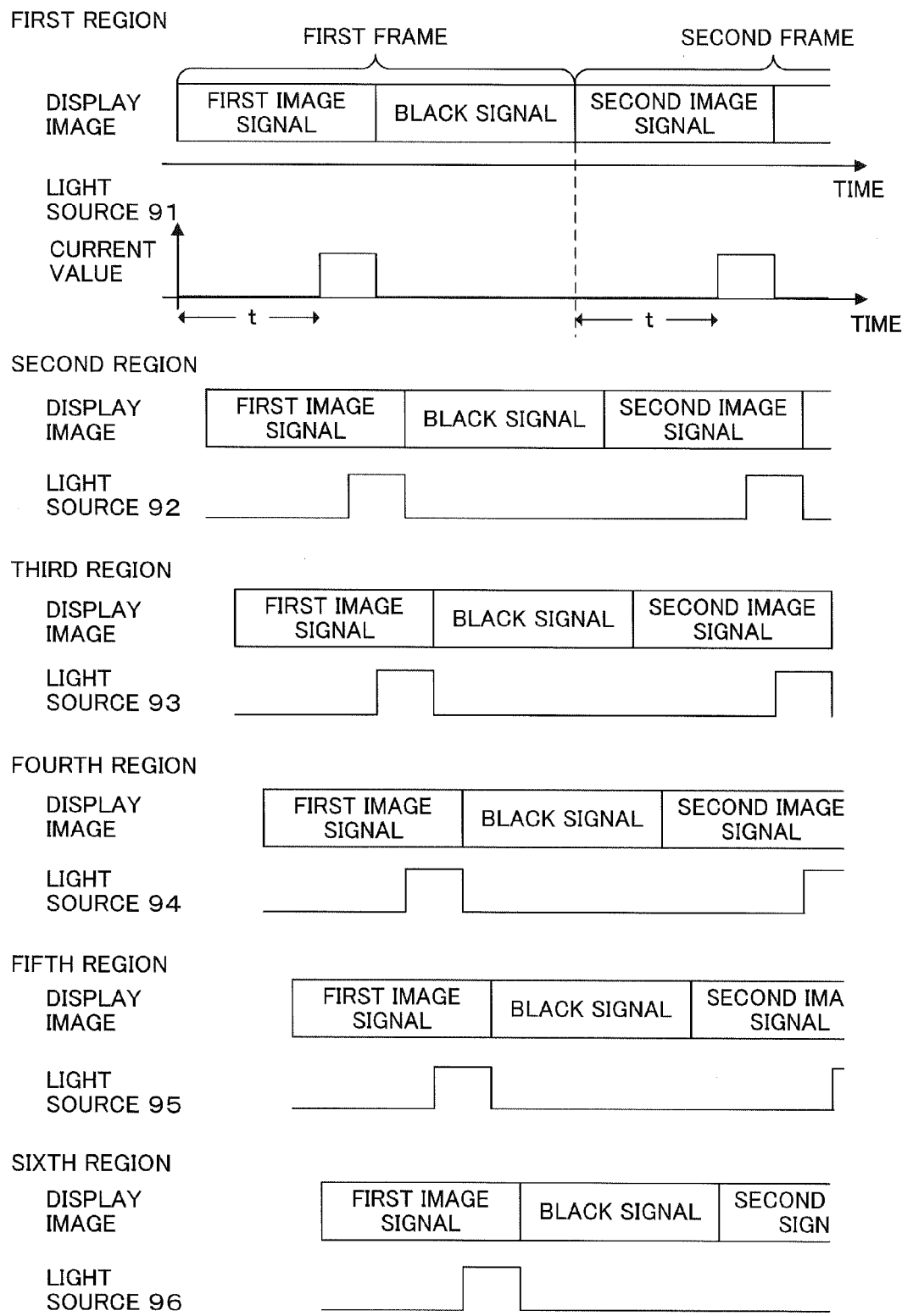
FIG. 2 is a view for describing control processing for the liquid crystal panel and light sources.
Figure 3A:
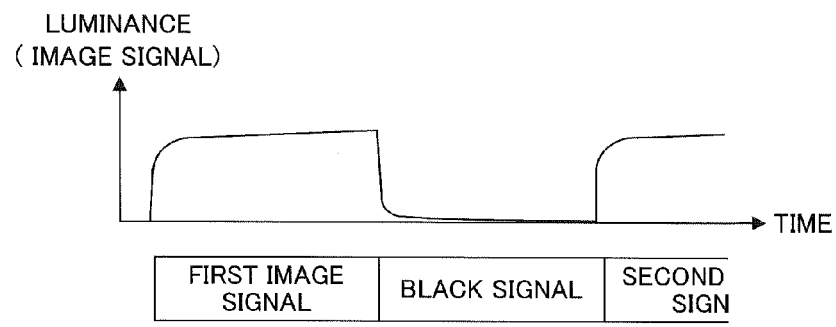
FIG. 3A is a view for describing deviation in luminance distribution in the liquid crystal panel.
Figure 3A:
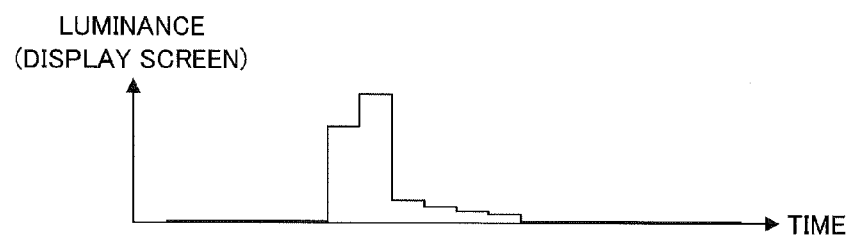
Figure 3B:
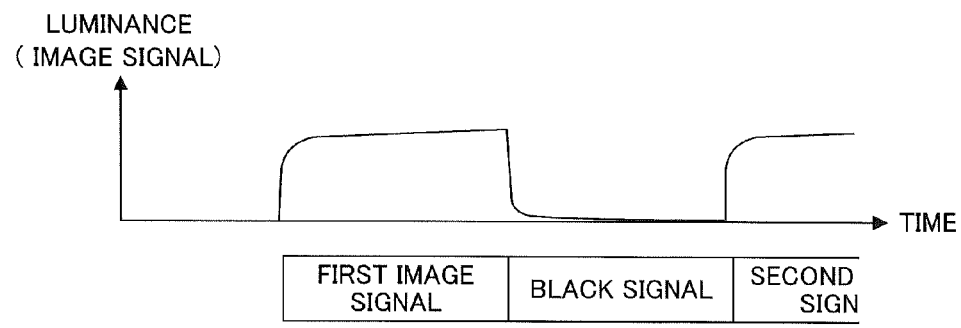
FIG. 3B is a view for describing deviation in luminance distribution in the liquid crystal panel.
Figure 3B:
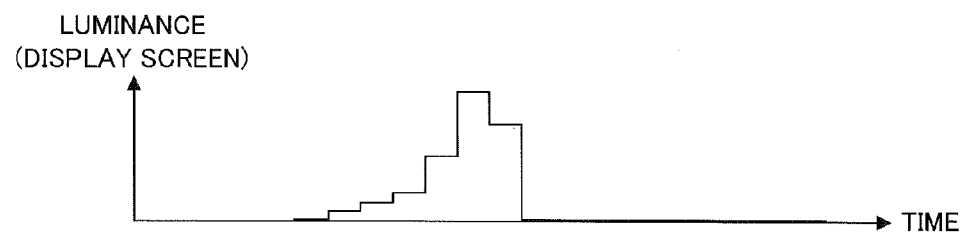
Figure 9A:
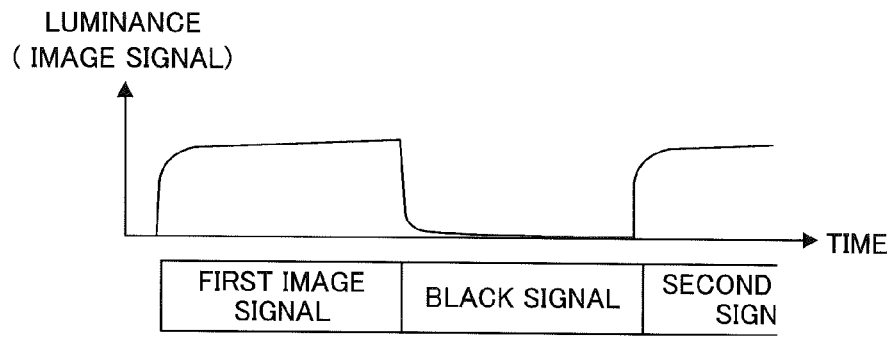
FIG. 9A is a view for describing the luminance distribution in the liquid crystal panel.
Figure 9A:
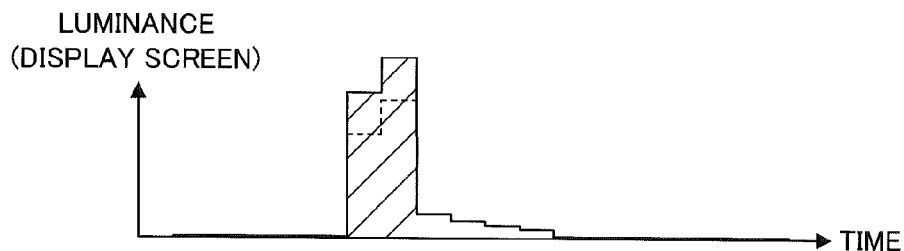
Figure 9B:
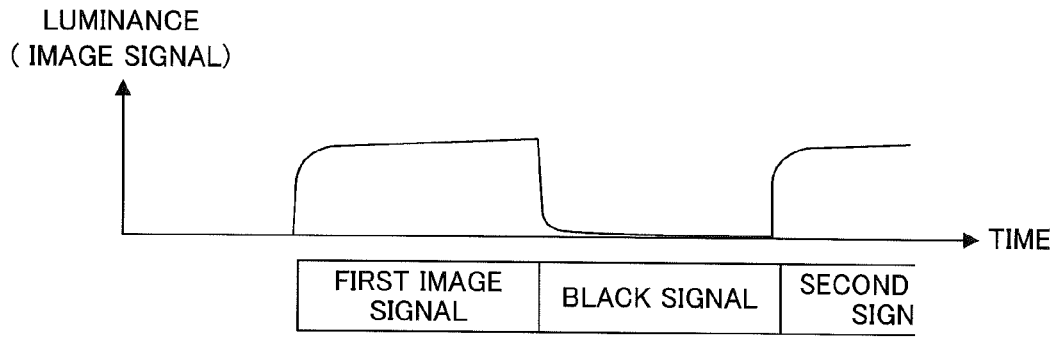
FIG. 9B is a view for describing the luminance distribution in the liquid crystal panel.
Figure 9B:
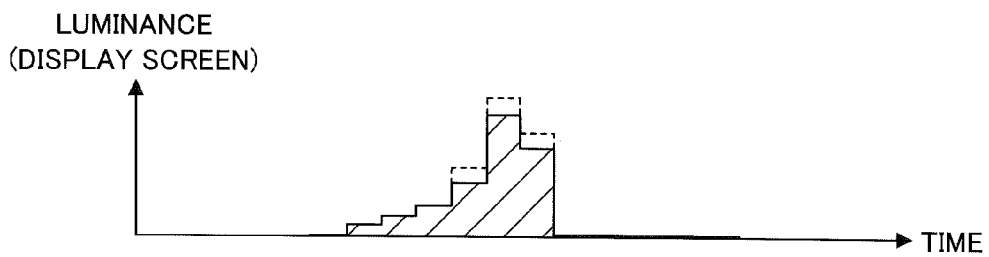

FIGS. 9A and 9B are views for describing the luminance distribution in the liquid crystal panel 1. FIGS. 9A and 9B illustrate a change in luminance based on the image signal and a change in luminance in the display screen with the passage of time, in the first region 1a and the sixth region 1f. With respect to the change in luminance in the display screen, in order to compare the control processing according to Embodiment 1 with the conventional processing which does not perform the control processing, the changes in luminance (changes in luminance illustrated in FIGS. 3A and 3B) in the display screen when performing the conventional processing are respectively illustrated by the dashed lines in FIGS. 9A and 9B.

As illustrated in FIGS. 9A and 9B, the luminance based on the first image signal is substantially the same as each other in the first region 1a and the sixth region 1f. The light from the light source 21b as well as the light from the light source 21a also enter into the first region 1a while the first image signal is displayed in the first region 1a, such that the change in luminance in the display screen of the first region 1a becomes the state as illustrated in FIG. 9A. In addition, the light from the light sources 21a to 21e as well as the light from the light source 21f also enter into the sixth region 1f while the first image signal is displayed in the sixth region 1f, such that the change in luminance in the display screen of the sixth region 1f becomes the state as illustrated in FIG. 9B.

According to Embodiment 1, the values of current applied to the light sources 21a and 21b of which light enters into the first region 1a displaying the first image signal are larger than the values of current applied to the light sources 91 and 92 in the conventional processing, such that the luminance in the display screen (the first region 1a) while the first image signal is displayed in the first region 1a is more increased than ever before. Meanwhile, among the light sources 21a to 21f of which light enters into the sixth region 1f displaying the first image signal, the values of current applied to the light sources 21d to 21f which give a larger influence by the light entering into the sixth region 1f are smaller than the values of current applied to the light sources 94 to 96 in the conventional processing, such that the luminance in the display screen (the sixth region 1f) while the first image signal is displayed in the sixth region 1f is more decreased than ever before. Thereby, it is possible to reduce a difference between the luminance at the upper region of the liquid crystal panel 1 and the luminance at the lower region thereof. Therefore, in the configuration of displaying the image signals in the respective regions 1a to 1f in an order from the upper portion to the lower portion of the liquid crystal panel 1, it is possible to uniformly control the luminance distribution in the liquid crystal panel 1.

Further, the luminance in the display screen of the second region 1b and the third region 1c is more increased than ever before similar to the first region 1a and the luminance in the display screen of the fourth region 1d and the fifth region 1e is more reduced than ever before similar to the sixth region 1f. Thereby, the difference in luminance in the display screen of the respective regions 1a to 1f is reduced and the luminance distribution in the liquid crystal panel 1 becomes uniform.

In addition, as illustrated in FIGS. 9A and 9B, the values of current applied to the respective light sources 21a to 21f may be specified, so that a sum of the luminance in the display screen when the image signals (for example, first image signal) are displayed in the first region 1a and the sixth region 1f, specifically, areas of the regions shown by the hatching in FIGS. 9A and 9B are the same as each other. In this case, the luminance distribution visually recognized by the user (viewer) with respect to the display screen of the liquid crystal panel 1 can be more uniformly controlled.

In this case, the values of current applied to the respective light sources 21a to 21f may be decided based on the results of the luminance distributions respectively detected in the display screen of the liquid crystal panel 1 by appropriately changing the values of current applied to the respective light sources 21a to 21f while displaying the predetermined image signal on the liquid crystal panel 1, for example, in the manufacturing step of the television receiver. Specifically, each value that a deviation in the luminance distribution in the liquid crystal panel 1 is further reduced may be decided as the values of current applied to the respective light sources 21a to 21f. In addition, the deviation in luminance distribution in the liquid crystal panel 1 is informed to the user by appropriately changing the values of current applied to the respective light sources 21a to 21f while displaying the predetermined image signal on the liquid crystal panel 1 in accordance with the instruction from the user of the television receiver, and each value that the deviation in the luminance distribution desired by the user can be achieved may be decided as the values of current applied to the respective light sources 21a to 21f.

In the television receiver of Embodiment 1, the image display unit 56 generates the image signal (frame) to be displayed on the liquid crystal panel 1 based on the image signal acquired from the image processing unit 54 and the black signal acquired from the black signal generation unit 55. Further, the image display unit 56 controls the panel driving circuit 57 and the light source driving circuit 58 based on the image signal (frame) to be displayed, and performs the image display control for the liquid crystal panel 1 and the driving control for the light source 21, thereby achieving the control processing as illustrated in FIG. 8.

(Embodiment 2)

Hereinafter, a television receiver according to Embodiment 2 will be described. The television receiver of Embodiment 2 has the same configuration as the above-described television receiver of Embodiment 1, and the same units of the configuration thereof will be denoted by the same reference numerals, and will not be described.

In the television receiver of Embodiment 2, the display control processing for the liquid crystal panel 1 by the panel driving circuit 57 and the driving control processing for the light source 21 by the light source driving circuit 58 are different from the above-described Embodiment 1. Processing other than the control processing for the liquid crystal panel 1 and the driving processing for the light source 21 are the same as the above-described Embodiment 1, and therefore will not be described.

Figure 10:
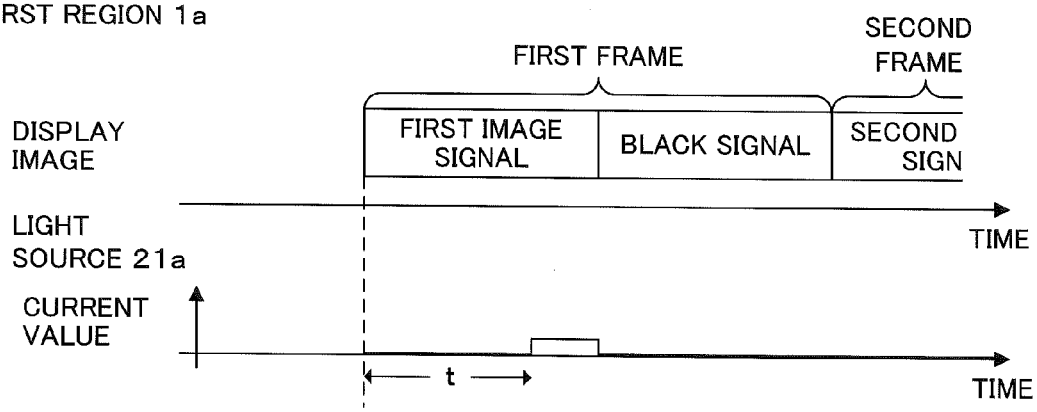
FIG. 10 is a view for describing the control processing for a liquid crystal panel and a light source according to Embodiment 2.
Figure 10:
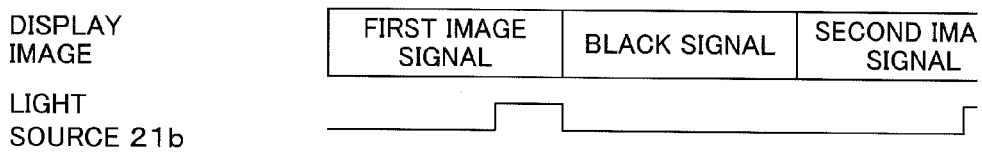
Figure 10:
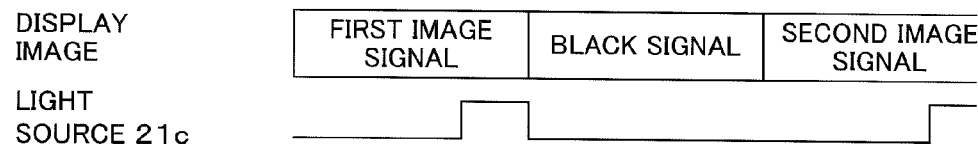
Figure 10:
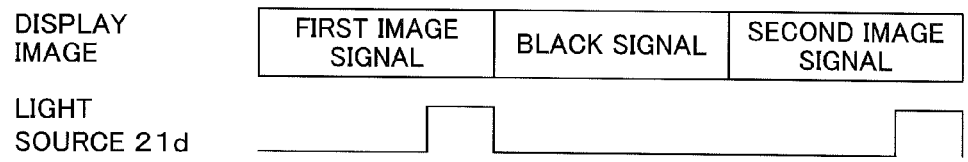
Figure 10:
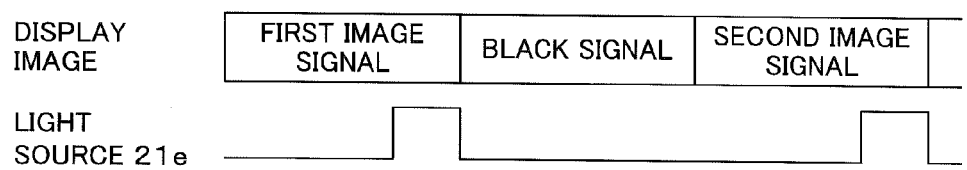
Figure 10:
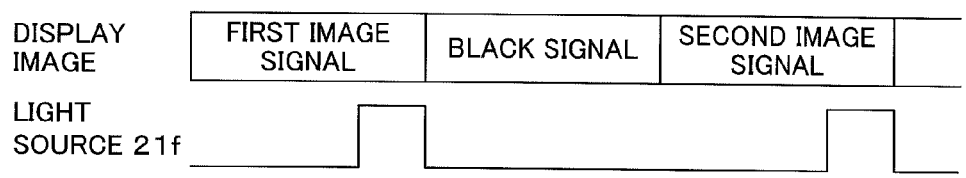

FIG. 10 is a view for describing the control processing for the liquid crystal panel 1 and the light source 21 according to Embodiment 2. Similarly to FIG. 8, FIG. 10 illustrates the change in the display image and the change in the values of current applied to the respective light sources 21a to 21f with the passage of time, in the respective regions 1a to 1f of the liquid crystal panel 1.

As illustrated in FIG. 10, the panel driving circuit 57 of Embodiment 2 displays the signals to be displayed in the respective regions 1f to 1a among the image signals and the black signals included in each frame, in the respective regions 1f, 1e, . . . , and 1a, with predetermined time lags in an order of the sixth region 1f, the fifth region 1e, . . . , and the first region 1a. Thereby, one frame is displayed using six regions.

The light source driving circuit 58 of Embodiment 2 turns on the respective light sources 21f to 21a corresponding to the respective regions 1f to 1a, during a period from a time point when a predetermined time t has elapsed since the panel driving circuit 57 started displaying the image signals in the respective regions 1f to 1a to a time point when the panel driving circuit 57 starts displaying the next black signal in the respective regions 1f to 1a. Specifically, the respective light sources 21f to 21a are turned on when the predetermined time t has elapsed after the displaying of the image signals in the respectively corresponding regions 1f to 1a is started, and are turned off when the displaying of the black signals in the respectively corresponding regions 1f to 1a is started. Herein, the predetermined time t is time considering the time (transient response time) until each liquid crystal display element reaches transmittance based on the signal to be displayed. When the above-described control processing is executed, the light from the respective light sources 21f to 21a enters (is leaked) into the regions 1f to 1a other than the regions 1f to 1a corresponding thereto, such that the luminance at the upper portion of the display screen is more increased than that of the lower portion thereof.

Therefore, the light source driving circuit 58 of Embodiment 2 reduces the values of current applied to the light sources 21f to 21a corresponding to the respective regions 1f to 1a, in an order in which the panel driving circuit 57 displays the image signals (each image signal included in the same frame) in the respective regions 1f to 1a. Specifically, the light source driving circuit 58 reduces the values of current applied to the respective light sources 21f to 21a in an order of the light sources 21f to 21a, and controls each light source 21 so as to sequentially reduce the luminance of light from the respective light sources 21f to 21a. Although the values of current applied to the respective light sources 21f to 21d are sequentially reduced, the values of current applied to the respective light sources 21f to 21d are larger than the values of current uniformly applied to the light sources 96 to 94 in the conventional processing. In addition, although the values of current applied to the respective light sources 21c to 21a are sequentially reduced, the values of current applied to the respective light sources 21c to 21a are smaller than the values of current uniformly applied to the light sources 93 to 91 in the conventional processing.

As described above, in the television receiver of Embodiment 2, the image signals or the black signals (each signal included in each frame) are displayed in the respective regions 1f to 1a in an order from the lower portion of the liquid crystal panel 1 to the upper portion thereof. Even in the above-described case, the respective light sources 21f to 21a are turned on only in the predetermined period among the period of displaying the image signals in the respective regions 1f to 1a, while the black signal is inserted between the image signals which follow in time sequence, thereby it is possible to achieve the pseudo impulse type display control. In addition, it is possible to suppress the deviation in the luminance distribution in the liquid crystal panel 1 which occurs in the case that the light from the respective light sources 21f to 21a enters (is leaked) into the regions 1f to 1a other than the regions 1f to 1a corresponding thereto.

Figure 11A:
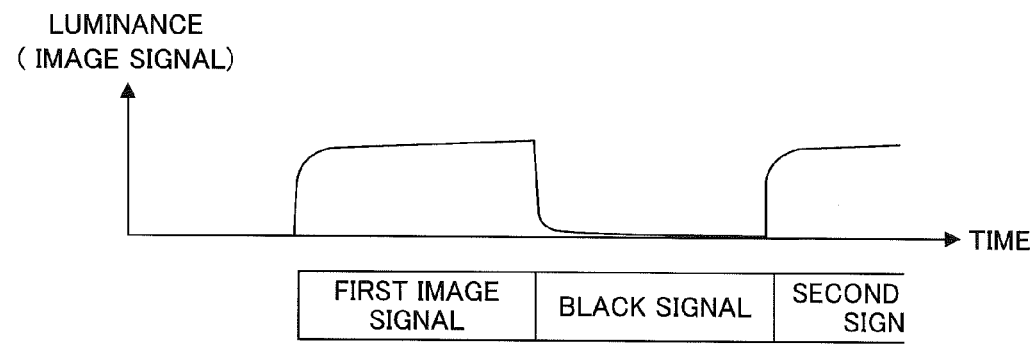
FIG. 11A is a view for describing the luminance distribution in the liquid crystal panel of Embodiment 2.
Figure 11A:
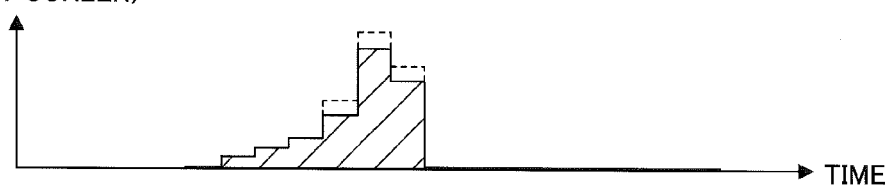
Figure 11B:
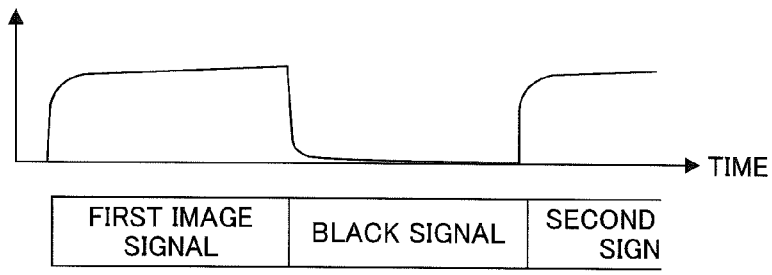
FIG. 11B is a view for describing the luminance distribution in the liquid crystal panel of Embodiment 2.
Figure 11B:
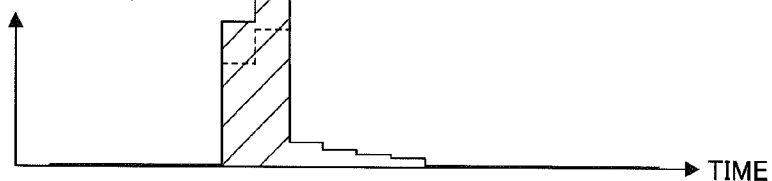

FIGS. 11A and 11B are views for describing the luminance distribution in the liquid crystal panel 1 of Embodiment 2. Similar to FIGS. 9A and 9B, FIGS. 11A and 11B illustrate the change in luminance based on the image signal and the change in luminance in the display screen with the passage of time, in the first region 1a and the sixth region 1f. In addition, with respect to the change in luminance in the display screen, in order to compare the control processing according to Embodiment 2 with the conventional processing which does not perform the control processing, the changes in luminance in the display screen when performing the conventional processing are respectively illustrated by the dashed lines in FIGS. 11A and 11B.

As illustrated in FIGS. 11A and 11B, the luminance based on the first image signal is substantially the same as each other in the first region 1a and the sixth region 1f. The light from the light sources 21e as well as the light from the light source 21f also enter into the sixth region 1f while the first image signal is displayed in the sixth region 1f, such that the change in luminance in the display screen of the sixth region 1*f* becomes the state as illustrated in FIG. 11B. In addition, the light from the light sources 21*b* to 21*f* as well as the light from the light sources 21*a* also enter into the first region 1*a* while the first image signal is displayed in the first region 1*a*, such that the change in luminance in the display screen of the first region 1*a* becomes the state as illustrated in FIG. 11A.

According to Embodiment 2, the values of current applied to the light sources 21*f* and 21*e* of which light enters into the sixth region 1*f* displaying the first image signal are larger than the values of current uniformly applied to the light sources 96 and 95 in the conventional processing, such that the luminance in the display screen (the sixth region 1*f*) while the first image signal is displayed in the sixth region 1*f* is more increased than ever before. Meanwhile, among the light sources 21*f* to 21*a* of which light enters into the first region 1*a* displaying the first image signal, the values of current applied to the light sources 21*c* to 21*a* which give a larger influence by the light entering into the first region 1*a* are smaller than the values of current uniformly applied to the light sources 93 to 91 in the conventional processing, such that the luminance in the display screen (the first region 1*a*) while the first image signal is displayed in the first region 1*a* is more reduced than ever before. Thereby, it is possible to reduce a difference between the luminance at the upper region of the liquid crystal panel 1 and the luminance at the lower region thereof. Therefore, in the configuration of displaying the image signals in the respective regions 1*f* to 1*a* in an order from the lower portion of the liquid crystal panel 1 to the upper portion thereof, it is possible to uniformly control the luminance distribution in the liquid crystal panel 1.

Further, the luminance in the display screen of the fifth region 1*e* and the fourth region 1*d* is more increased than ever before similar to the sixth region 1*f*, and the luminance in the display screen of the third region 1*c* and the second region 1*b* is more decreased than ever before similar to the first region 1*a*. Thereby, the difference in luminance in the display screen of the respective regions 1*a* to 1*f* is reduced, and the luminance distribution in the liquid crystal panel 1 becomes uniform.

Also in Embodiment 2, as illustrated in FIGS. 11A and 11B, the respective light sources 21 may be driven so that the sum of the luminance in the display screen when the image signals (for example, first image signal) are displayed in the first region 1*a* and the sixth region 1*f*, specifically, the areas of the regions shown by the hatching in FIGS. 11A and 11B are the same as each other. In this case, the luminance distribution visually recognized by the user (viewer) with respect to the display screen of the liquid crystal panel 1 can be uniformly controlled.

In addition, also in the television receiver of Embodiment 2, the image display unit 56 generates the image signal (frame) to be displayed on the liquid crystal panel 1 based on the image signal acquired from the image processing unit 54 and the black signal acquired from the black signal generation unit 55. Further, the image display unit 56 controls the panel driving circuit 57 and the light source driving circuit 58 based on the image signal (frame) to be displayed, and performs the image display control for the liquid crystal panel 1 and the driving control for the light source 21, thereby achieving the control processing as illustrated in FIG. 10.

(Embodiment 3)

Hereinafter, a television receiver according to Embodiment 3 will be described. Only the configuration of the light source unit of the television receiver of Embodiment 3 is different from that of the television receivers of the above-described Embodiments 1 and 2, and other configuration is the same as the above-described Embodiments 1 and 2. In addition, in the television receiver of Embodiment 3, various processing such as the control processing for the liquid crystal panel 1 by the panel driving circuit 57 and the driving processing for the light source 21 by the light source driving circuit 58 are the same as the processing in the above-described Embodiments 1 and 2.

The television receivers according to Embodiments 1 and 2 are the light guide type (edge light type and side edge type) liquid crystal displays in which the light source unit 2 irradiates the liquid crystal panel 1 with light through the light guide plate 3. The display apparatus of the present invention is not limited thereto, and may be applied to a direct type liquid crystal display in which the liquid crystal panel 1 is directly irradiated with light from the backlight (light source) disposed on the back surface side of the liquid crystal panel 1.

Figure 12A:
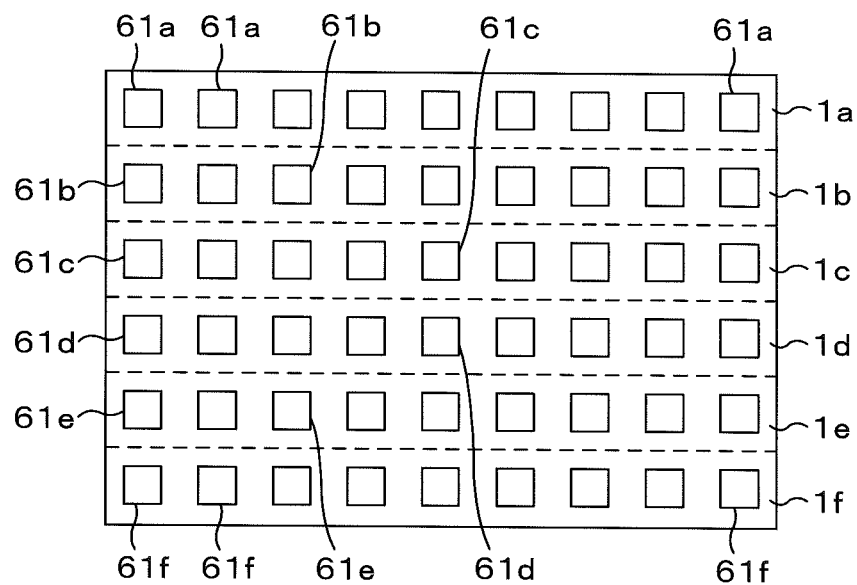
FIG. 12A is a schematic view illustrating a relationship between a liquid crystal panel and a light source according to Embodiment 3.
Figure 12B:
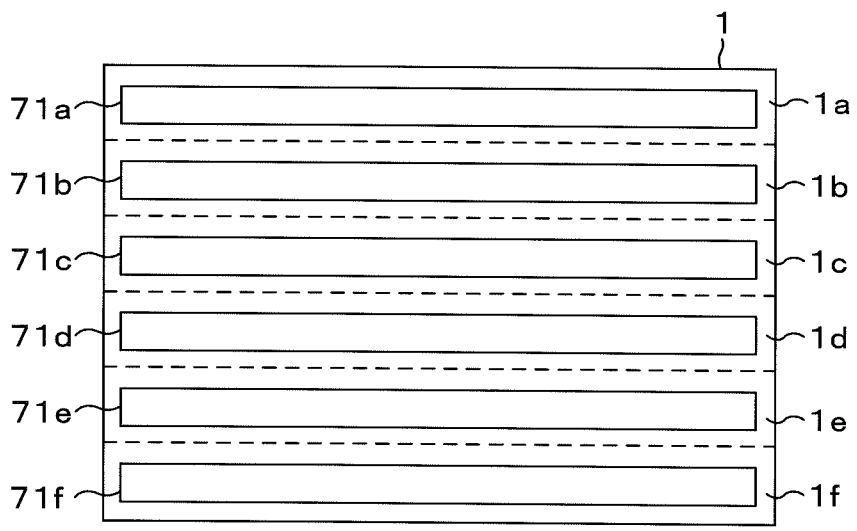
FIG. 12B is a schematic view illustrating a relationship between a liquid crystal panel and a light source according to Embodiment 3.

FIGS. 12A and 12B are schematic views illustrating a relationship between the liquid crystal panel 1 and the light source according to Embodiment 3. FIG. 12A illustrates, as an example of Embodiment 3, a relationship between respective regions 1*a* to 1*f* of the liquid crystal panel 1 and light sources 61*a* to 61*f* using a light emitting diode (LED), for example. In the example illustrated in FIG. 12A, the light sources 61*a* to 61*f* respectively include nine light sources disposed so as to face the back surfaces of the respective regions 1*a* to 1*f* of the liquid crystal panel 1. In this configuration, the first region 1*a* of the liquid crystal panel 1 is irradiated with light from the nine light sources 61*a*, the second region 1*b* is irradiated with light from the nine light sources 61*b*, the third region 1*c* is irradiated with light from the nine light sources 61*c*, the fourth region 1*d* is irradiated with light from the nine light sources 61*d*, the fifth region 1*e* is irradiated with light from the nine light sources 61*e*, and the sixth region 1*f* is irradiated with light from the nine light sources 61*f*. In this configuration, the same driving control is performed on the respective nine light sources of the light sources 61*a* to 61*f*, but each different driving control is performed on each of the light sources 61*a* to 61*f*. Further, the number of each the light sources 61*a* to 61*f* is not limited to nine, and may have any number capable of appropriately irradiating the respective regions 1*a* to 1*f* with light.

FIG. 12B illustrates a relationship between the respective regions 1*a* to 1*f* of the liquid crystal panel 1 and light sources 71*a* to 71*f* using a cold cathode fluorescent lamp (CCFL), for example. In the example illustrated in FIG. 12B, the light sources 71*a* to 71*f* are respectively disposed so as to face the back surfaces of the respective regions 1*a* to 1*f* of the liquid crystal panel 1. In this configuration, each different driving control is performed on each of the light sources 71*a* to 71*f*, and the each of the first region 1*a* to the sixth region 1*f* of the liquid crystal panel 1 is irradiated with light from the respective light sources 71*a* to 71*f*.

Also in the direct type liquid crystal display illustrated in FIGS. 12A and 12B, various processing described in the above Embodiments 1 and 2 can be executed. Further, also in the direct type liquid crystal display illustrated in FIGS. 12A and 12B, when the light from the respective light sources enters into the regions other than the regions corresponding thereto, a deviation in the luminance distribution in the liquid crystal panel 1 occurs. Thereby, also in the television receiver of Embodiment 3, the control processing for the liquid crystal panel 1 and the driving processing for the light sources 61*a* to 61*f* (or 71*a* to 71*f*) illustrated in the above-described Embodiments 1 and 2 are performed, thereby it is possible to reduce a difference between the luminance at the upper region of the liquid crystal panel 1 and the luminance at the lower region thereof, and it is possible to uniformly control the luminance distribution in the liquid crystal panel 1.

In the above-described Embodiments 1 to 3, the display region of the liquid crystal panel 1 is divided into six regions in the vertical direction, and the display control of the image is performed for each region 1a to 1f, and the driving control is performed for each light source 21a to 21f (or 61a to 61f or 71a to 71f) corresponding to the respective regions 1a to 1f. In addition thereto, the display region of the liquid crystal panel 1 is divided into six regions in the lateral direction, and the display control of the image may be performed for each region, and the driving control may also be performed for each light source corresponding to the respective regions. In addition, the display region of the liquid crystal panel 1 is not limited to the configuration of dividing into six regions, and it may be divided into four to eight regions. In this case, it may be configured in such a manner that the light sources as much as the number of the divided regions are provided, and the respective divided regions are irradiated with light by the respective light sources. Further, the display control of the image may be performed for each divided region, and the driving control may be performed for each light source corresponding to the respective regions.

In the above-described Embodiments 1 to 3, the examples in which the display apparatus according to the present invention are applied to the television receiver has been described. In addition thereto, the display apparatus of the present invention may be applied to a digital photo frame which displays an image on the display panel based on image data imaged by an imaging apparatus or image data received through a network, a digital signage which displays an image on the display panel based on data previously stored in an internal memory or data received through the network, and the like.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims. In addition, technical features described in each embodiment may be combined with each other, and new technical features may be formed by the combination.

The invention claimed is:

1. A display apparatus comprising:
a liquid crystal panel which displays an image;
a plurality of light sources which are juxtaposed in a predetermined direction, and irradiate the liquid crystal panel with light;
a black insertion unit which inserts black signals during at least a part of respective frame periods in a plurality of image frames;
a display control unit which respectively displays signals corresponding to respective regions, among each image frame into which the black signals are inserted by the black insertion unit, in the respective regions of the liquid crystal panel irradiated with light from the respective light sources, in an order along an arrangement direction of the respective regions corresponding to a juxtaposition direction of the light sources; and
a light source control unit which irradiates the respective regions with light from the light sources corresponding to the respective regions, during a period from a time point when a predetermined time has elapsed since the display control unit started displaying the signals in the respective regions of the liquid crystal panel to a time point when the display control unit starts displaying the black signals in the respective regions, within a period in which the display control unit respectively displays the signals in the respective regions of the liquid crystal panel,
wherein the light source control unit controls the respective light sources so as to reduce luminance of light from the light sources corresponding to the respective regions by reducing values of current applied to the respective light sources, in an order in which the light sources corresponding to the respective regions of the liquid crystal panel irradiate with light, such that the light source control unit applies a highest value of current to a first light source of the respective light sources and applies a lowest value of current to a last light source of the respective light sources, wherein the light source control unit sequentially reduces the value of current applied to the respective light sources from the first light source to the last light source, and the value of current applied to the last light source is greater than zero.

2. The display apparatus according to claim 1, wherein the light source control unit controls the luminance of light from the respective light sources so that the luminance in a display screen of the respective regions is substantially the same as each other when the display control unit respectively displays the corresponding signals in the respective regions of the liquid crystal panel.

3. The display apparatus according to claim 1, wherein the light source control unit irradiates the respective regions with light, during a latter period within a period in which the display control unit displays signals other than the black signals inserted by the black insertion unit, among the signals corresponding to the respective regions in each image frame, in the respective regions of the liquid crystal panel.

4. A television receiver comprising:
the display apparatus according to claim 1; and
a receiving unit which receives television broadcasts,
wherein an image based on the television broadcasts received by the receiving unit is displayed on the display apparatus.

5. The display apparatus according to claim 1, further comprising a light guide plate with one surface thereof facing a back surface of the liquid crystal panel, wherein the light sources face an end surface of the light guide plate.

* * * * *